US012812551B2

(12) United States Patent
Deghel et al.

(10) Patent No.: US 12,812,551 B2
(45) Date of Patent: Nov. 24, 2026

(54) ENHANCED OPERATION FOR TRANSMISSION POWER PRIORITIZATION

(71) Applicant: NOKIA TECHNOLOGIES OY, Espoo (FI)

(72) Inventors: Matha Deghel, Montrouge (FR); Ian Dexter Garcia, Naperville, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 346 days.

(21) Appl. No.: 18/434,720

(22) Filed: Feb. 6, 2024

(65) Prior Publication Data

US 2025/0254623 A1 Aug. 7, 2025

(51) Int. Cl.
*H04W 52/14* (2009.01)
*H04W 52/24* (2009.01)

(52) U.S. Cl.
CPC ....... *H04W 52/146* (2013.01); *H04W 52/243* (2013.01)

(58) Field of Classification Search
CPC ............. H04W 52/146; H04W 52/243; H04W 52/346; H04W 52/365; H04W 52/367; H04W 52/22; H04W 52/0238; H04W 52/244; H04L 5/001; H04B 7/18543
See application file for complete search history.

(56) References Cited

U.S. PATENT DOCUMENTS 11,419,139 B2 * 8/2022 Salim .................... H04L 1/1812
11,696,272 B2 * 7/2023 Tang ........................ H04B 7/26 370/329
12,556,434 B2 * 2/2026 He .......................... H04L 5/001
2020/0229104 A1 * 7/2020 MolavianJazi ....... H04W 52/54
2021/0250927 A1 * 8/2021 Liu ....................... H04W 72/23
2021/0410154 A1 * 12/2021 Islam ................ H04W 72/0453
2022/0393830 A1 * 12/2022 Wong .................... H04W 72/04
(Continued)

FOREIGN PATENT DOCUMENTS

WO 2022/211572 A1 10/2022

OTHER PUBLICATIONS

Office action received for corresponding Vietnamese Patent Application No. 1-2024-08504, dated May 22, 2025, 2 pages of office action and 1 pages of translation available.
(Continued)

*Primary Examiner* — Andrew Wendell
(74) *Attorney, Agent, or Firm* — Carter, DeLuca & Farrell LLP

(57) ABSTRACT

Systems, methods, apparatuses, and computer program products for enhanced operation for transmission power operation. A method may include receiving, from a network element, a configuration to transmit an indication of an uplink transmission adjustment to the network element. The method may also include determining an existence of overlapping of uplink transmissions to the network element. The method may further include transmitting, in response to the determination of the existence of overlapping of uplink transmissions, the indication to the network element. In addition, the method may include performing, in response to the determination of the existence of overlapping of uplink transmissions, at least one of the uplink transmission adjustment of the uplink transmission to the network element or an uplink scheduling adjustment.

15 Claims, 6 Drawing Sheets

(56) References Cited

U.S. PATENT DOCUMENTS

| | | | | |
|---|---|---|---|---|
| 2023/0100655 | A1* | 3/2023 | Takeda | H04W 52/146 370/522 |
| 2023/0254854 | A1 | 8/2023 | Cirik et al. | |
| 2023/0300756 | A1* | 9/2023 | Khoshnevisan | H04L 5/0035 455/522 |
| 2023/0354318 | A1* | 11/2023 | Cao | H04L 5/001 |
| 2025/0024436 | A1* | 1/2025 | Zhang | H04L 5/14 |
| 2025/0374281 | A1* | 12/2025 | Zhou | H04L 5/0005 |

OTHER PUBLICATIONS

Office action received for corresponding Japanese Patent Application No. 2024-221398, dated Sep. 8, 2025, 3 pages of office action and no pages of translation available.
"3rd Generation Partnership Project; Technical Specification Group Radio Access Network; NR; Multiplexing and channel coding (Release 18)", 3GPP TS 38.212 V18.0.0, Sep. 2023, pp. 1-278.
"3rd Generation Partnership Project; Technical Specification Group Radio Access Network; NR; Radio Resource Control (RRC) protocol specification (Release 17)", 3GPP TS 38.331 V17.6.0, Sep. 2023, pp. 1-1337.
"3rd Generation Partnership Project; Technical Specification Group Radio Access Network; NR; Medium Access Control (MAC) protocol specification (Release 17)", 3GPP TS 38.321 V17.6.0, Sep. 2023, pp. 1-253.
Extended European Search Report received for corresponding European Patent Application No. 25155642.9, dated Jun. 23, 2025, 7 pages.
3GPP TS 38.101-1 V18.4.0 (Dec. 2023), 3rd Generation Partnership Project; Technical Specification Group Radio Access Network; NR; User Equipment (UE) radio transmission and reception; Part 1: Range 1 Standalone (Release 18), 1011 pages.
3GPP TS 38.213 V18.1.0 (Dec. 2023), 3rd Generation Partnership Project; Technical Specification Group Radio Access Network; NR; Physical layer procedures for control (Release 18), 277 pages.
3GPP TS 38.215 V18.1.0 (Dec. 2023), 3rd Generation Partnership Project; Technical Specification Group Radio Access Network; NR; Physical Layer Measurements (Release 18); 30 pages.

* cited by examiner

ENHANCED OPERATION FOR TRANSMISSION POWER PRIORITIZATION

FIELD

Some example embodiments may generally relate to mobile or wireless telecommunication systems, such as Long Term Evolution (LTE) or fifth generation (5G) new radio (NR) access technology, or 5G beyond, or sixth generation (6G) access technology, or other communications systems. For example, certain example embodiments may relate to enhanced operation for transmission power operation.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, fifth generation (5G) radio access technology or new radio (NR) access technology and/or sixth generation (6G) radio access technology. Fifth generation (5G) and sixth generation (6G) wireless systems refer to the next generation (NG) of radio systems and network architecture. 5G and 6G network technology is mostly based on new radio (NR) technology, but the 5G/6G (or NG) network can also build on E-UTRAN radio. It is estimated that NR may provide bitrates on the order of 10-20 Gbit/s or higher, and may support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the Internet of Things (IoT).

SUMMARY

Some example embodiments may be directed to a method. The method may include receiving, from a network element, a configuration to transmit an indication of an uplink transmission adjustment to the network element. The method may also include determining an existence of overlapping of uplink transmissions to the network element. The method may further include transmitting, in response to the determination of the existence of overlapping of uplink transmissions, the indication to the network element. In addition, the method may include performing, in response to the determination of the existence of overlapping of uplink transmissions, at least one of the uplink transmission adjustment of the uplink transmission to the network element or an uplink scheduling adjustment.

Other example embodiments may be directed to an apparatus. The apparatus may include at least one processor and at least one memory storing instructions that, when executed by a processor, cause the apparatus at least to receive, from a network element, a configuration to transmit an indication of an uplink transmission adjustment to the network element. The apparatus may also be caused to determine an existence of overlapping of uplink transmissions to the network element. The apparatus may further be caused to transmit, in response to the determination of the existence of overlapping of uplink transmissions, the indication to the network element. In addition, the apparatus may be caused to perform, in response to the determination of the existence of overlapping of uplink transmissions, at least one of the uplink transmission adjustment of the uplink transmission to the network element or an uplink scheduling adjustment.

Other example embodiments may be directed to an apparatus. The apparatus may include means for receiving, from a network element, a configuration to transmit an indication of an uplink transmission adjustment to the network element. The apparatus may also include means for determining an existence of overlapping of uplink transmissions to the network element. The apparatus may further include means for transmitting, in response to the determination of the existence of overlapping of uplink transmissions, the indication to the network element. In addition, the apparatus may include means for performing, in response to the determination of the existence of overlapping of uplink transmissions, at least one of the uplink transmission adjustment of the uplink transmission to the network element or an uplink scheduling adjustment.

In accordance with other example embodiments, a non-transitory computer readable medium may be encoded with instructions that may, when executed in hardware, perform a method. The method may include receiving, from a network element, a configuration to transmit an indication of an uplink transmission adjustment to the network element. The method may also include determining an existence of overlapping of uplink transmissions to the network element. The method may further include transmitting, in response to the determination of the existence of overlapping of uplink transmissions, the indication to the network element. In addition, the method may include performing, in response to the determination of the existence of overlapping of uplink transmissions, at least one of the uplink transmission adjustment of the uplink transmission to the network element or an uplink scheduling adjustment.

Other example embodiments may be directed to a computer program product that performs a method. The method may include receiving, from a network element, a configuration to transmit an indication of an uplink transmission adjustment to the network element. The method may also include determining an existence of overlapping of uplink transmissions to the network element. The method may further include transmitting, in response to the determination of the existence of overlapping of uplink transmissions, the indication to the network element. In addition, the method may include performing, in response to the determination of the existence of overlapping of uplink transmissions, at least one of the uplink transmission adjustment of the uplink transmission to the network element or an uplink scheduling adjustment.

Other example embodiments may be directed to an apparatus that may include circuitry configured to receive, from a network element, a configuration to transmit an indication of an uplink transmission adjustment to the network element. The apparatus may also include circuitry configured to determine an existence of overlapping of uplink transmissions to the network element. The apparatus may further include circuitry configured to transmit, in response to the determination of the existence of overlapping of uplink transmissions, the indication to the network element. In addition, the apparatus may include circuitry configured to perform, in response to the determination of the existence of overlapping of uplink transmissions, at least one of the uplink transmission adjustment of the uplink transmission to the network element or an uplink scheduling adjustment.

Further example embodiments may be directed to a method. The method may include configuring a user equipment to transmit an indication of an uplink transmission adjustment. The method may also include receiving overlapping uplink transmissions from the user equipment. The method may further include receiving, from the user equipment, the indication due to the overlapping of the uplink transmissions.

Other example embodiments may be directed to an apparatus. The apparatus may include at least one processor and at least one memory including computer program code. The at least one memory and the computer program code may be configured to, with the at least one processor, cause the apparatus at least to configure a user equipment to transmit an indication of an uplink transmission adjustment. The apparatus may also be caused to receive overlapping uplink transmissions from the user equipment. The apparatus may further be caused to receive, from the user equipment, the indication due to the overlapping of the uplink transmissions.

Other example embodiments may be directed to an apparatus. The apparatus may include means for configuring a user equipment to transmit an indication of an uplink transmission adjustment. The apparatus may also include means for receiving overlapping uplink transmissions from the user equipment. The apparatus may further include means for receiving, from the user equipment, the indication due to the overlapping of the uplink transmissions.

In accordance with other example embodiments, a non-transitory computer readable medium may be encoded with instructions that may, when executed in hardware, perform a method. The method may include configuring a user equipment to transmit an indication of an uplink transmission adjustment. The method may also include receiving overlapping uplink transmissions from the user equipment. The method may further include receiving, from the user equipment, the indication due to the overlapping of the uplink transmissions.

Other example embodiments may be directed to a computer program product that performs a method. The method may include configuring a user equipment to transmit an indication of an uplink transmission adjustment. The method may also include receiving overlapping uplink transmissions from the user equipment. The method may further include receiving, from the user equipment, the indication due to the overlapping of the uplink transmissions.

Other example embodiments may be directed to an apparatus that may include circuitry configured to configure a user equipment to transmit an indication of an uplink transmission adjustment. The apparatus may also include circuitry configured to receive overlapping uplink transmissions from the user equipment. The apparatus may further include circuitry configured to receive, from the user equipment, the indication due to the overlapping of the uplink transmissions.

BRIEF DESCRIPTION OF THE DRAWINGS

For proper understanding of example embodiments, reference should be made to the accompanying drawings, wherein.

DETAILED DESCRIPTION

Figure 1:
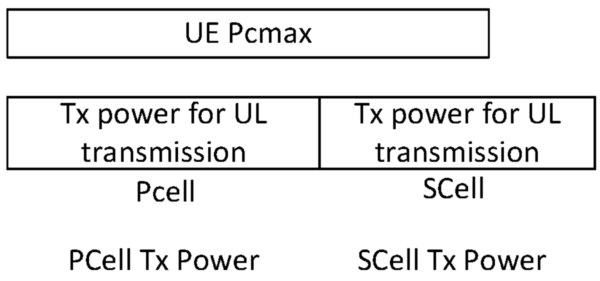
FIG. 1 illustrates an example overlap of uplink (UL) transmissions and Tx power.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for enhanced operation for transmission power operation.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "base station", "cell", "node", "gNB", "network" or other similar language throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

New radio (NR) physical uplink shared channel (PUSCH) power control may be based on a combination of open-loop power control and closed-loop power control. Open-loop power control may include support for fractional pathloss compensation, where the user equipment (UE) estimates the uplink (UL) pathloss based on downlink (DL) measurements, and sets the transmit power accordingly. On the other hand, closed-loop power control may be based on explicit transmit power-control (TPC) commands provided by the network.

As described in the specifications of the $3^{rd}$ Generation Partnership Project (3GPP), the UE may determine the PUSCH transmission power. For instance, the UE may indicate/determine closed-loop parameters (e.g., closed-loop index and/or TCP command) and open-loop parameters (e.g., pathloss reference RS, p0, and/or alpha). The TCP command may be carried in downlink control information (DCI) scheduling the PUSCH transmission. The TPC command (and corresponding closed-loop index) may also be carried jointly to multiple UEs by means of group-common DCI using DCI format 2-2.

PUSCH transmission power may be dependent upon certain power control parameters. These power control parameters may include, for example, a closed-loop index (e.g., PC adjustment state), a TPC command ($f_{b,f,c}$, absolute or accumulative TPC command), a pathloss reference signal (RS), p0 (also denoted as $P_{0\_UE\_PUSCH}$), alpha (for partial of full pathloss compensation), and/or DELTA_TF (i.e., $\Delta_{TF,b,f,c}(i)$), also sometimes referred to as power adjustment component. DELTA_TF may model how the required received power varies when the number of information bits per resource element (BPRE) changes due to different modulation schemes and channel-coding rates.

The PUSCH transmission power $P_{PUSCH,b,f,c}(i, j, q_d, l)$ in PUSCH transmission occasion i may be determined if a UE transmits a PUSCH on an active UL bandwidth part (BWP) b of carrier f of the serving cell c using a parameter set configuration with index j and PUSCH power control adjustment with index l. For instance, the UE may determine the PUSCH transmission power $P_{PUSCH,b,f,c}(i, j, q_d, l)$ in PUSCH transmission occasion i as follows:

$$P_{PUSCH,b,f,c}(i,j,q_d,l) = \left\{ \begin{array}{c} P_{CMAX,f,c}(i) \\ P_{O\_PUSCH^{b,f,c}}(j) + 10\log_{10}\left(2^{\mu}\cdot M_{RB,b,f,c}^{PUSCH}(i)\right) + \alpha_{b,f,c}(j)\cdot PL_{b,f,c}(q_d) + \Delta_{TF,b,f,c}(i) + f_{b,f,c}(i,l) \end{array} \right\} [dBm]$$

Sounding reference signal (SRS) power control may be similar to PUSCH power control. For example, the SRS transmission power may be determined based on when a UE transmits SRS based on a configuration by SRS-ResourceSet on an active UL bandwidth part (BWP) b of carrier f of serving cell c using SRS power control adjustment state with index l. For instance, the UE may determine the SRS transmission power $P_{SRS,b,f,c}(i, q_s, l)$ in SRS transmission occasion i as follows:

$$P_{PUSCH,b,f,c}(i,j,q_d,l) = \left\{ \begin{array}{c} P_{CMAX,f,c}(i) \\ P_{O\_SRS^{b,f,c}}(j) + 10\log_{10}(2^{\mu}\cdot M_{SRS,b,f,c}(i)) + \alpha_{SRS,b,f,c}(q_s)\cdot PL_{b,f,c}(q_d) + h_{b,f,c}(i,l) \end{array} \right\} [dBm]$$

Physical uplink control channel (PUCCH) transmission power may be determined when a UE transmits PUCCH on an active UL BWP b of carrier f in the primary cell c using PUCCH power control adjustment state with index l. For instance, the UE may determine the PUCCH transmission power $P_{PUCCH,b,f,c}(i, q_u, q_d, l)$ in PUCCH transmission occasion i as follows:

$$P_{PUCCH,b,f,c}(i,q_u,q_d,l) = \left\{ \begin{array}{c} P_{CMAX,f,c}(i) \\ P_{O\_PUCCH,,b,f,c}(q_u) + 10\log_{10}\left(2^{\mu}\cdot M_{RB,b,f,c}^{PUCCH}(i)\right) + PL_{b,f,c}(q_d) + \Delta_{F\_PUCCH}(F) + \Delta_{TF,b,f,c}(i) + g_{b,f,c}(i,l) \end{array} \right\} [dBm]$$

Transmission power reductions may be prioritized. For example, the procedure for prioritization for transmission power reductions may involve parallel UL transmission on different (serving) cells, such as in case of carrier aggregation (CA) or dual connectivity. For a single cell operation with two UL carriers or for an operation with CA, if a total UE transmit power for PUSCH, PUCCH, physical random access channel (PRACH), or SRS transmissions on serving cells in a frequency range in a respective transmission occasion i exceeds $\hat{P}_{CMAX}(i)$ (where $\hat{P}_{CMAX}(i)$ is the linear value of $P_{CMAX}(i)$ in transmission occasion i for FR1 and for FR2), the UE allocates power to PUSCH/PUCCH/PRACH/SRS transmissions according to a priority order (e.g., in descending order). This may be done so that the total UE transmit power for transmissions on serving cells in the frequency range is smaller than or equal to $\hat{P}_{CMAX}(i)$ for that frequency range in every symbol of transmission occasion i. For the purpose of power allocation, if a UE is provided UCI-MuxWithDifferentPriority and the UE multiplexes hybrid automatic repeat request-acknowledgment (HARQ-ACK) information in a PUSCH, a priority index of the PUSCH is the larger of (a) the priority index of the PUSCH prior to multiplexing the HARQ-ACK information, and (b) the larger priority index of the HARQ-ACK information. When determining a total transmit power for serving cells in a frequency range in a symbol of transmission occasion i, the UE does not include power for transmissions starting after the symbol of transmission occasion i. Additionally, the total UE transmit power in a symbol of a slot may be defined as the sum of the linear values of UE transmit powers for PUSCH, PUCCH, PRACH, and SRS in the symbol of the slot.

When the priority order is the same, and for an operation with CA, the UE may prioritize power allocation for transmissions on the primary cell (PCell) of the master cell group (MCG) or the secondary cell group (SCG) over transmissions on a secondary cell (SCell). When the priority order is the same, and for operation with two UL carriers, the UE may prioritize power allocation for transmissions on the carrier where the UE is configured to transmit PUCCH. If PUCCH is not configured for any of the two UL carriers, the UE may prioritize power allocation for transmissions on the non-supplementary UL carrier.

LTE and NR support power headroom (PHR) medium access control control element (MAC CE), which contains a nominal UE maximum transmit power and the power headroom of the transmission containing the PHR report. The PHR is the difference between the nominal UE maximum transmit power and the estimated power (in the equations above). The PHR report may also include (1) the P-bit which is a power-backoff indication due to power management, and (2) a maximum permitted exposure (MPE) value which is the amount of power back-off to meet MPE requirements.

The P-bit and MPE (P-MPR) values may also be used to satisfy power exposure requirements. P-MPRc is the power management maximum power reduction for ensuring compliance with applicable electromagnetic energy absorption requirements and addressing unwanted emissions/self-defense requirements in case of simultaneous transmissions on multiple radio access technologies (RATs) for scenarios not in the scope of 3GPP RAN specifications. P-MPRc may also be the power management maximum power reduction for ensuring compliance with applicable electromagnetic energy absorption requirements in case of proximity detection is used to address such requirements that require a lower maximum output power.

In some cases, when the UE is power limited due to overlapping UL transmissions (e.g., PUCCH/PUSCH/SRS/PRACH) in, for example, carrier aggregation or in dual connectivity (i.e., UE connected to two radio access technologies such as 5G and 6G), and more generally in case of overlapping/parallel UL transmissions on a same component carrier (CC) or different CCs/ULs/bandwidths, the UE may perform or apply one or more UL transmissions. For instance, one example UL transmission may include scaling down the power or applying dropping to the lowest priority first until the aggregated power is within a configured maximum transmit/output power (Pcmax) and specifically within a total configured maximum output power (denoted $P_{CMAX}$ or simply Pcmax). Another example UL transmission may include scaling or dropping of the whole or part(s) of a transmission, which may be left to UE implementation. Thus, when there is Tx power reduction, SRS, PUCCH, and/or PUSCH may be impacted due to either power reduction or (full/partial) dropping. This would then negatively impact UE performance in UL or DL due to the impact on CSI/HARQ-ACK reporting.

In some instances, the gNB may not be aware of the UE applying dropping and/or (significant) Tx power reduction due to power reduction prioritization or due to the UE being power-limited. The gNB may also not suspect that such event(s) has occurred at the UE. However, such an assumption takes time (e.g., not a timely knowledge), and would need to be based on some detection algorithm. Even then, this assumption would merely be a guess by the gNB.

Figure 2:
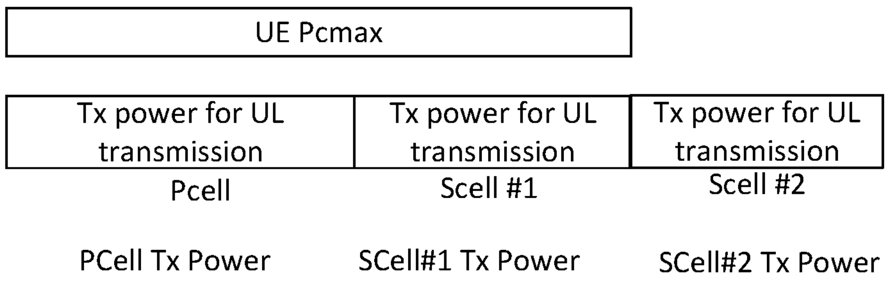
FIG. 2 illustrates another example overlap of UL transmissions and Tx power.

In view of the drawbacks described above, certain example embodiments may provide ways to reflect the power reduction prioritization (dropping or significant power reduction) due to overlapping/parallel (or simultaneous) UL transmissions. For instance, FIG. 1 illustrates an example overlap of UL transmissions and required Tx power. As illustrated in FIG. 1, UE Pcmax covers the entire Tx power for UL transmission in the PCell, whereas only a portion of the Tx power for UL transmission in SCell is covered. That is, the UE in this example is applying a power reduction due to overlapping UL transmissions in the PCell and SCell. On the other hand, FIG. 2 illustrates another example overlap of UL transmission and required Tx power. As illustrated in FIG. 2, the UE Pcmax covers the entire Tx power for UL transmissions in the PCell and SCell #1, but there is no UE power exhibited at SCell #2. As such, the UE applies dropping where UL transmission is dropped from SCell #2. In the examples of FIGS. 1 and 2, the gNB is unaware of the power reduction and dropping. Additionally, overlapping/parallel UL transmissions may occur across CC/s/cells or carriers or cell groups, or across bandwidths (or bandwidth parts), or within a same cell. As previously noted, even though it may be possible for the gNB to guess/estimate the power reduction and/or dropping, the process would take time, and would be very inefficient. That is, there is loose or no coordination between network entities receiving transmissions including cases of inter-band CA, dual connectivity or multi-RAT, and multi-transmission reception points (TRP) (with non-ideal backhaul between the TRPs).

Figure 3:
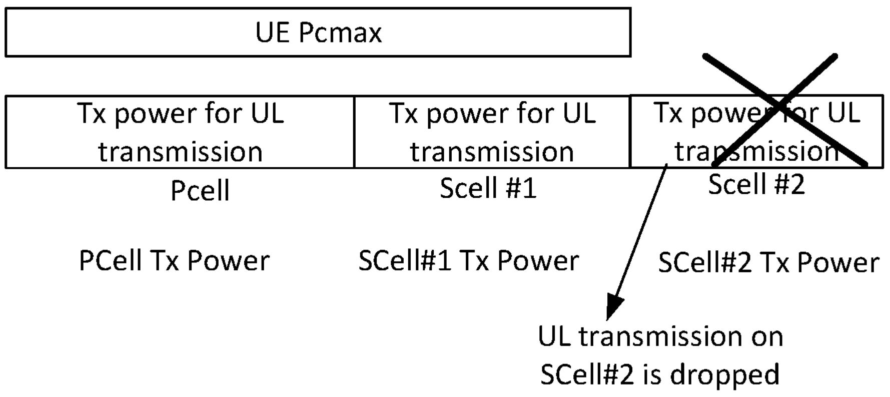
FIG. 3 illustrates an example of dropping/blanking, according to certain example embodiments.
Figure 4:
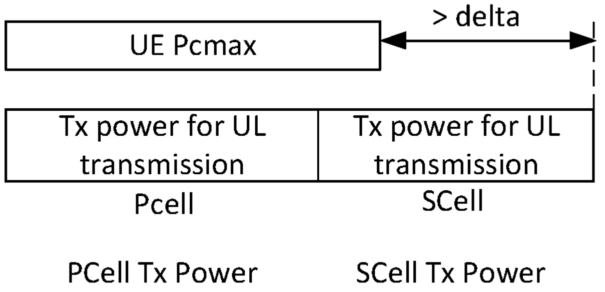
FIG. 4 illustrates an example of power reduction, according to certain example embodiments.

FIG. 3 illustrates an example of dropping/blanking, according to certain example embodiments, and FIG. 4 illustrates an example of power reduction, according to certain example embodiments. As illustrated in FIG. 3, the UL transmission on SCell #2 is dropped due to power reduction prioritization (e.g., when there is overlapping/parallel UL transmissions), which causes the UE to transmit an indication to the gNB. In another scenario, as illustrated in FIG. 4, the UE may perform significant power reduction (e.g., 6 dB or greater) at the SCell due to power reduction prioritization (e.g., when there is overlapping/parallel UL transmissions), which causes the UE to transmit an indication to the gNB. In view of the power limitation of UEs due to overlapping/parallel UL transmissions, the UE of certain example embodiments may provide an indication to the gNB. In some example embodiments, the indication may include information indicative of the UE applying dropping/blanking due to power reduction prioritization/UE being power-limited due to the overlapping/parallel UL transmissions. For instance, the UE may be power-limited when the total power limit is reached (or would be reached) or the per-cell power-limit is/would be reached. However, in some instances, power limitation may occur whether or not there is simultaneous transmission. Additionally, if the per-cell power limit is reached during simultaneous transmission without the configured per-cell power being reached, then one or more cells may be reduce its power (or blank its transmission) to still accommodate the total power constraint. In this context, power reduction prioritization may correspond to the rule by which during simultaneous transmission, the per-cell Tx power reduction is ordered among the cells.

In certain example embodiments, the information may alternatively indicate that the UE is applying (significant) Tx power reduction. For example, application of significant Tx power reduction may be defined as a power reduction that is larger than an threshold or leading to a Tx power lower than a threshold defined by the gNB and communicated to the UE (e.g., via a radio resource control (RRC) message), due to the power reduction prioritization to the UE being power-limited. In other example embodiments, another indication may be provided to the gNB from the UE to indicate that the UE has not applied dropping due to power reduction prioritization. Alternatively, or additionally, the UE may indicate that the UE has not applied (significant) Tx power reduction due to power reduction prioritization.

According to certain example embodiments, the indication may be transmitted from the UE to the gNB per CC or cell group, per bandwidth part or bandwidth, per panel, per capability value set index, per control resource set pool index (CORESETPoolIndex), per reference signal set, or per TRP. According to some example embodiments, the indication may include an index or identity (or ID) for one or more items/entities. The items/entities may include, for example, CC/cell, cell group, bandwidth (or bandwidth part) CORESET pool, panel ID, per capability value set index, TRP, remote radio head (RRH), node, and/or UL/DL reference signal resource set. In some example embodiments, an index or identity (or ID) may be indicated if the UE applies dropping and/or (significant) Tx power reduction on/for the corresponding item/entity. Alternatively, or additionally, any of the above indexes or identities (e.g., IDs) may be indicated if the UE has not applied dropping and/or (significant) Tx power reduction on/in the corresponding item/entity.

In certain example embodiments, the indication may include an identification of which UL signal(s)/channel(s) the information corresponds or is related to. Additionally, the indication may be transmitted by the UE to the gNB through at least one UL resource (e.g., PUCCH and PUSCH) on the cell/cell group over which dropping and/or (significant) Tx power reduction due to power prioritization has occurred. Alternatively, in other example embodiments, the indication may be sent on at least one UL resource corresponding to at least one dedicated configured cell, cell group, or link.

According to other example embodiments, the indication may be carried through uplink control information (UCI) on PUCCH, or UCI piggybacked or multiplexed on PUSCH. For example, the UE may be configured to send/multiplex the UCI on PUCCH/PUSCH (or any other channel or signal) of the PCell. The PUCCH/PUSCH (or any other UL channel or signal) may be part of the overlapping UL transmissions or it may be a separate transmission (or a later one). In other example embodiments, the UE may also be configured to send/multiplex the UCI on the PUCCH/PUSCH (or any other UL channel or signal) of the SCell over which dropping and/or (significant) Tx power reduction due to power prioritization has occurred if the corresponding resulting Tx power is above a threshold, or if the power reduction is less than an offset. The PUCCH/PUSCH may also be part of the overlapping UL transmissions or it may be a transmission (or a later one).

In certain example embodiments, the UE may be configured to provide the indication in at least one of the overlapping UL transmissions. The UE may also be configured to provide the indication after a predetermined period of time from the overlapping transmissions (e.g., from the first symbol or the last symbol of the transmissions overlap, or of the UL transmissions overlapping in time). In some example embodiments, the predetermined period of time may be set by the gNB and communicated to the UE. Alternatively or additionally to UCI, the UE may transmit the indication via a MAC CE through an UL resource on a PCell or an SCell. The example embodiments described herein for UCI may also be applicable for MAC CE by replacing UCI by MAC CE.

According to certain example embodiments, the UE may indicate to the network (e.g., gNB) that the indication is carried into an UL channel/signal. This may be done using at least one bit via UCI or MAC CE, or using a reference signal selection by the UE such as, for example, a dedicated demodulation reference signal (DMRS) configuration/sequence etc.). Alternatively, the UE may transmit the indication to the network through UL resource selection. For example, the UE may select and/or transmit a dedicated UL resource (e.g., scheduling-request-like resource), and the network would then know, based on this selection/transmission, that the indication or part of the indication is being sent or that it needs to be sent.

In some example embodiments, the indication transmitted to the network from the UE may be carried through dedicated/shared periodic UL resource(s), semi-persistent UL resource(s), or scheduling-request-like resource(s) (or resource configuration). These resources may be configured per cell, cell group, per TRP, or per bandwidth. The UE may also indicate to the network that the dropping fo an UL transmission corresponds to a partial or full dropping. The UE may further indicate to the network the number of transmissions, cells, or links over which the UE has applied dropping and/or (significant) Tx power reduction.

Figure 5:
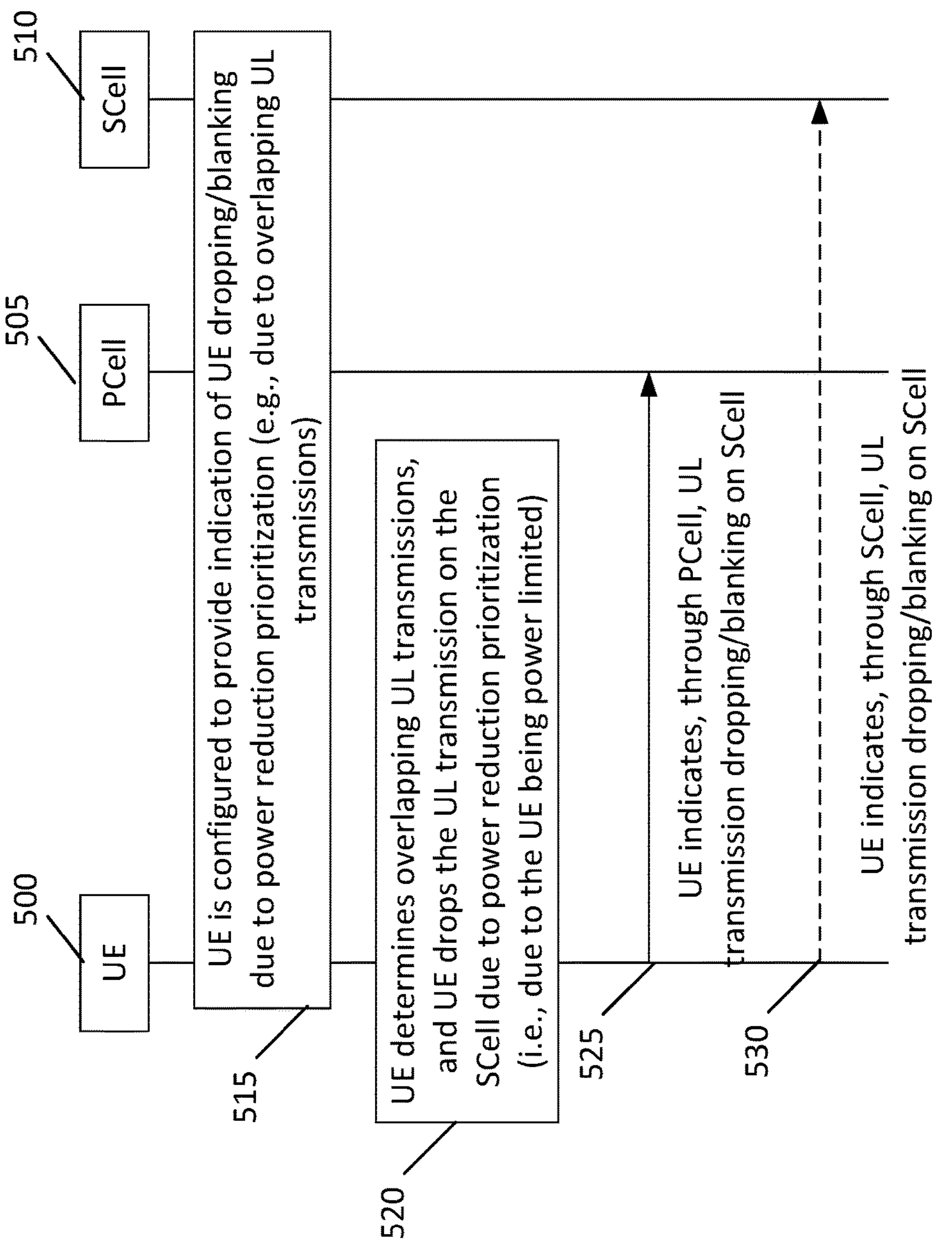
FIG. 5 illustrates an example signal diagram, according to certain example embodiments.

FIG. 5 illustrates an example signal diagram, according to certain example embodiments. At 515, the UE 500 is configured by the network to provide an indication to the network of UE dropping/blanking transmissions due to power reduction prioritization when there are overlapping UL transmissions from the UE 500. At 520, the UE 500 determines that there are overlapping UL transmissions, and the UE 500 may drop the UL transmission on the SCell 510 due to power reduction prioritization (i.e., due to the UE being power limited). At 525, the UE 500 transmits an indication to the network through the PCell of UL transmission dropping/blanking on the SCell. Alternatively, in other example embodiments, at 530, the UE 500 transmits an indication to the network through the SCell of UL transmission dropping/blanking on the PCell.

Figure 6:
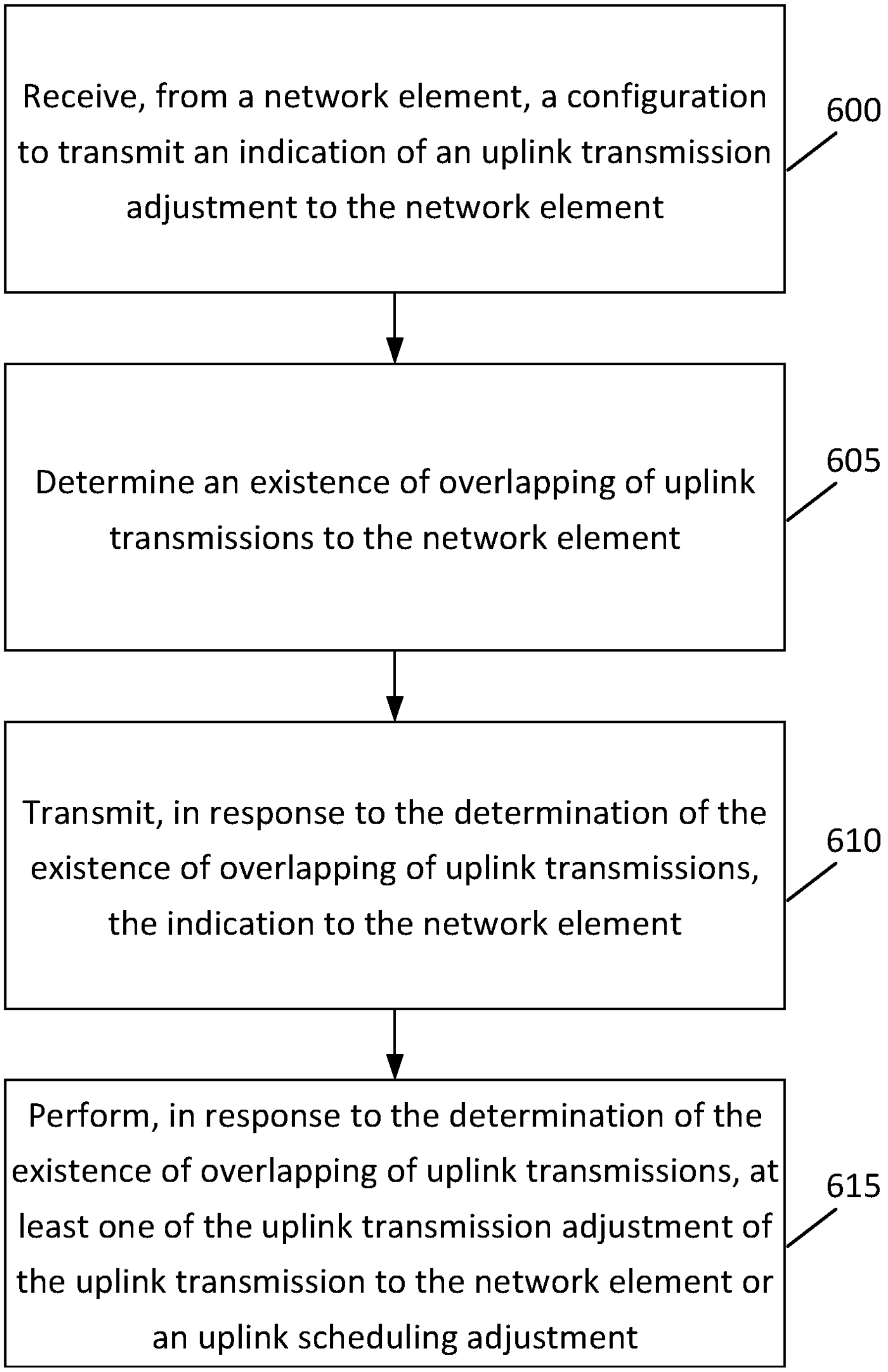
FIG. 6 illustrates an example flow diagram of a method, according to certain example embodiments.

FIG. 6 illustrates an example flow diagram of a method, according to certain example embodiments. In an example embodiment, the method of FIG. 6 may be performed by a network entity, or a group of multiple network elements in a 3GPP system, such as LTE or 5G-NR. For instance, in an example embodiment, the method of FIG. 6 may be performed by a UE, similar to one of apparatuses 10 or 20 illustrated in FIG. 8.

As illustrated in FIG. 6, the method may include, at 600, receiving, from a network element, a configuration to transmit an indication of an uplink transmission adjustment to the network element. The method may also include, at 605, determining an existence of overlapping of uplink transmissions to the network element. The method may further include, at 610, transmitting, in response to the determination of the existence of overlapping of uplink transmissions, the indication to the network element. In addition, the method may include, at 615, performing, in response to the determination of the existence of overlapping of uplink transmissions, at least one of the uplink transmission adjustment of the uplink transmission to the network element or an uplink scheduling adjustment.

According to certain example embodiments, the configuration to transmit the indication comprises at least one of: a configuration of the indication to be transmitted per component carrier or per cell group, per bandwidth part or per bandwidth, per panel, per control resource set pool index, per reference signal set, or per transmission reception point; a configuration of the indication to be transmitted through at least one uplink resource on a primary cell, a primary cell group, or a primary link; a configuration of the indication to be transmitted on at least one uplink resource on a cell or cell group over which a blanking or a transmit power reduction due to power prioritization has occurred, configuration of the indication to be transmitted on at least one uplink resource corresponding to at least one dedicated or configured cell, a cell group, or a link; a configuration of the indication to be transmitted in at least one of the overlapping uplink transmissions; or a configuration of the indication to be transmitted after a period of time from the overlapping uplink transmissions.

According to some example embodiments, the uplink transmission adjustment may include at least one of a blanking of or power reduction for an uplink transmission. According to other example embodiments, the indication comprises at least one of: whether or not the apparatus has applied the uplink transmission adjustment; a partial or a full blanking of the uplink transmission; a number of transmissions, cells, or links over which the apparatus has applied the uplink transmission adjustment; an indication of an index or identity for one or more component carriers, a cell group, a bandwidth, a control resource set pool, a panel identifier, a transmission reception point, a remote radio head, a node, or an uplink or a downlink reference resource set that the uplink transmission adjustment corresponds to or is related to; or an indication of an uplink signal or an uplink channel that the uplink transmission adjustment corresponds to or is related to.

In certain example embodiments, the performance of the uplink transmission blanking of the uplink transmission or power reduction for the uplink transmission may be triggered by a power reduction prioritization of at least one uplink transmission.

In some example embodiments, the indication may be transmitted through at least one of: an uplink control information that is sent or multiplexed on a physical uplink control channel or a physical uplink shared channel of a primary cell; an uplink control information that is sent or multiplexed on a physical control channel or a physical shared channel of a secondary cell over which the uplink transmission adjustment is applied; a medium access control control element through an uplink resource on a primary cell or a secondary cell; an uplink channel or an uplink signal; an uplink resource selection by the apparatus; or a dedicated or a shared periodic uplink resource, a semi-persistent uplink resource, or a scheduling-request-like resource.

In other example embodiments, the physical uplink control channel or the physical uplink shared channel may be part of the overlapping uplink transmissions or a different uplink transmission. In further example embodiments, the indication may include information indicative of a power reduction larger than an offset or a power reduction leading to a transmit power lower than a threshold.

Figure 7:
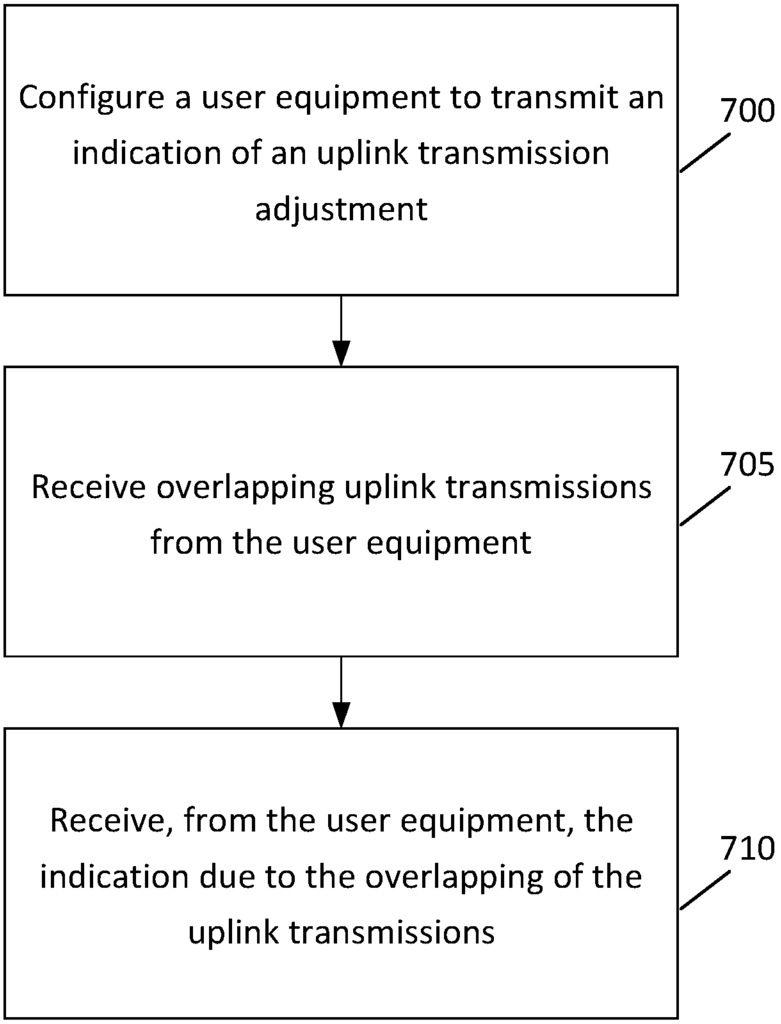
FIG. 7 illustrates an example flow diagram of another method, according to certain example embodiments.

FIG. 7 illustrates an example flow diagram of a further method, according to certain example embodiments. In an example embodiment, the method of FIG. 7 may be performed by a network entity, or a group of multiple network elements in a 3GPP system, such as LTE or 5G-NR. For instance, in an example embodiment, the method of FIG. 7 may be performed by a BS, gNodeB, or network, similar to one of apparatuses 10 or 20 illustrated in FIG. 8.

As illustrated in FIG. 7, the method may include, at 700, configuring a user equipment to transmit an indication of an uplink transmission adjustment. The method may also include, at 705, receiving overlapping uplink transmissions from the user equipment. The method may further include, at 710, receiving, from the user equipment, the indication due to the overlapping of the uplink transmissions.

According to certain example embodiments, the configuration of the user equipment to transmit the indication may include at least one of: a configuration of the indication to be transmitted per component carrier or per cell group, per bandwidth part or per bandwidth, per panel, per control resource set pool index, per reference signal set, or per transmission reception point; a configuration of the indication to be transmitted through at least one uplink resource on a primary cell, a primary cell group, or a primary link; a configuration of the indication to be transmitted on at least one uplink resource on a cell or cell group over which a blanking or a transmit power reduction due to power prioritization has occurred, configuration of the indication to be transmitted on at least one uplink resource corresponding to at least one dedicated or configured cell, a cell group, or a link; a configuration of the indication to be transmitted in at least one of the overlapping uplink transmissions; or a configuration of the indication to be transmitted after a period of time from the overlapping uplink transmissions.

According to other example embodiments, the uplink transmission adjustment may include at least one of a blanking of or power reduction for an uplink transmission. According to further example embodiments, the indication comprises at least one of: whether or not the apparatus has applied the uplink transmission adjustment; a partial or a full blanking of the uplink transmission; a number of transmissions, cells, or links over which the apparatus has applied the uplink transmission adjustment; an indication of an index or identity for one or more component carriers, a cell group, a bandwidth, a control resource set pool, a panel identifier, a transmission reception point, a remote radio head, a node, or an uplink or a downlink reference resource set that the uplink transmission adjustment corresponds to or is related to; or an indication of an uplink signal or an uplink channel that the uplink transmission adjustment corresponds to or is related to.

In certain example embodiments, the indication may be received through at least one of: an uplink control information that is sent or multiplexed on a physical uplink control channel or a physical uplink shared channel of a primary cell; an uplink control information that is sent or multiplexed on a physical control channel or a physical shared channel of a secondary cell over which the uplink transmission adjustment is applied; a medium access control control element through an uplink resource on a primary cell or a secondary cell; an uplink channel or an uplink signal; an uplink resource selection by the apparatus; or a dedicated or a shared periodic uplink resource, a semi-persistent uplink resource, or a scheduling-request-like resource.

Figure 8:
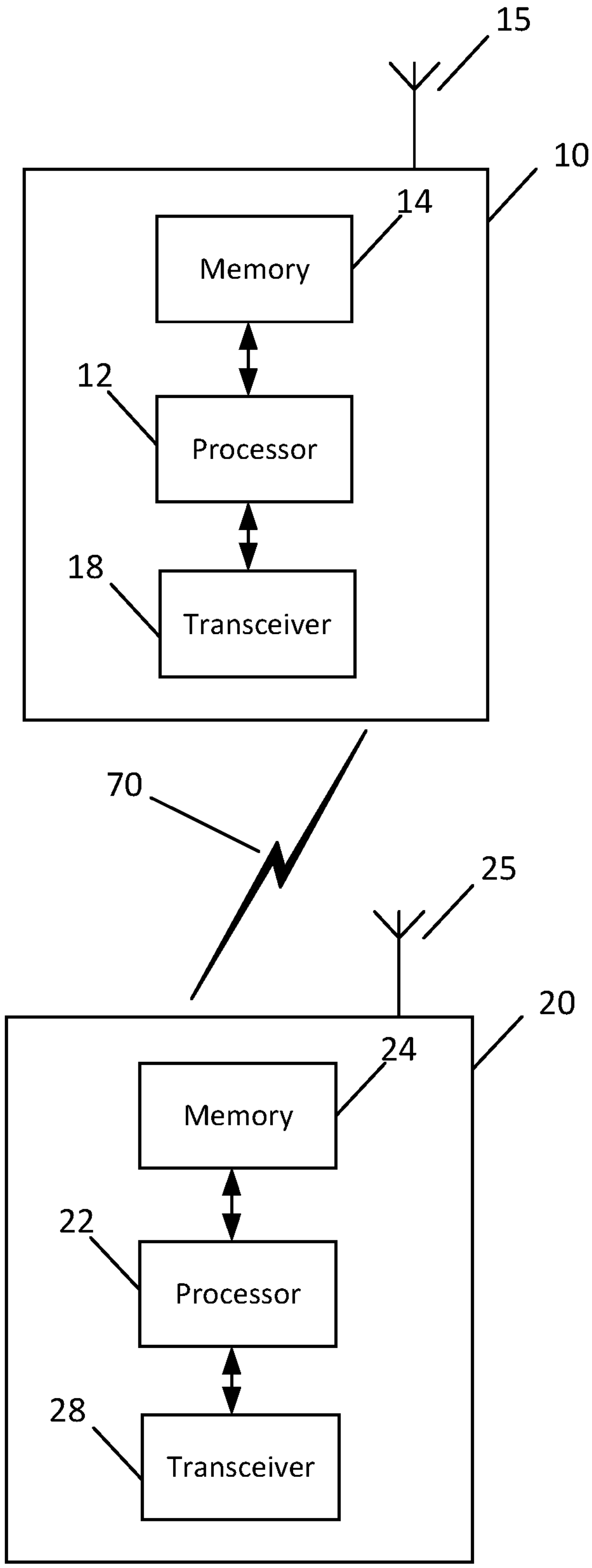
FIG. 8 illustrates a set of apparatuses, according to certain example embodiments.

FIG. 8 illustrates a set of apparatuses 10 and 20 according to certain example embodiments. In certain example embodiments, apparatuses 10 and 20 may be elements in a communications network or associated with such a network. For example, apparatus 10 may be a UE, or other similar radio communication computer device, and apparatus 20 may be a BS, gNB, TRP, LMF, network, or other similar computing device.

In some example embodiments, apparatuses 10 and 20 may include one or more processors, one or more computer-readable storage medium (for example, memory, storage, or the like), one or more radio access components (for example, a modem, a transceiver, or the like), and/or a user interface. In some example embodiments, apparatuses 10 and 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatuses 10 and 20 may include components or features not shown in FIG. 8.

As illustrated in the example of FIG. 8, apparatuses 10 and 20 may include or be coupled to a processors 12 and 22 for processing information and executing instructions or operations. Processors 12 and 22 may be any type of general or specific purpose processor. In fact, processors 12 and 22 may include one or more of general-purpose computers, special purpose computers, microprocessors, DSPs, field-programmable gate arrays (FPGAs), application-specific integrated circuits (ASICs), and processors based on a multi-core processor architecture, as examples. While a single processors 12 and 22 is shown in FIG. 8, multiple processors may be utilized according to other example embodiments. For example, it should be understood that, in certain example embodiments, apparatuses 10 and 20 may include two or more processors that may form a multiprocessor system (e.g., in this case processors 12 may represent a multiprocessor) that may support multiprocessing. According to certain example embodiments, the multiprocessor system may be tightly coupled or loosely coupled (e.g., to form a computer cluster).

Processors 12 and 22 may perform functions associated with the operation of apparatuses 10 and 20 including, as some examples, precoding of antenna gain/phase parameters, encoding and decoding of individual bits forming a communication message, formatting of information, and overall control of the apparatuses 10 and 20, including processes and examples illustrated in FIGS. 1-7.

Apparatuses 10 and 20 may further include or be coupled to a memories 14 and 24 (internal or external), which may be respectively coupled to processors 12 and 24 for storing information and instructions that may be executed by processors 12 and 24. Memories 14 and 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memories 14 and 24 can be comprised of any combination of random access memory (RAM), read only memory (ROM), static storage such as a magnetic or optical disk, hard disk drive (HDD), or any other type of non-transitory machine or computer readable media. The instructions stored in memories 14 and 24 may include program instructions or computer program code that, when executed by processors 12 and 22, enable the apparatuses 10 and 20 to perform tasks as described herein.

In certain example embodiments, apparatuses 10 and 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processors 12 and 22 and/or apparatuses 10 and 20 to perform any of the methods and examples illustrated in FIGS. 1-7.

In some example embodiments, apparatuses 10 and 20 may also include or be coupled to one or more antennas 15 and 25 for receiving a downlink signal and for transmitting via an UL from apparatuses 10 and 20. Apparatuses 10 and 20 may further include a transceivers 18 and 28 configured to transmit and receive information. The transceivers 18 and 28 may also include a radio interface (e.g., a modem) coupled to the antennas 15 and 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an UL.

For instance, transceivers 18 and 28 may be configured to modulate information on to a carrier waveform for transmission by the antennas 15 and 25 and demodulate information received via the antenna 15 and 25 for further processing by other elements of apparatuses 10 and 20. In other example embodiments, transceivers 18 and 28 may be capable of transmitting and receiving signals or data directly. Additionally or alternatively, in some example embodiments, apparatus 10 may include an input and/or output device (I/O device). In certain example embodiments, apparatuses 10 and 20 may further include a user interface, such as a graphical user interface or touchscreen.

In certain example embodiments, memories 14 and 34 store software modules that provide functionality when executed by processors 12 and 22. The modules may include, for example, an operating system that provides operating system functionality for apparatuses 10 and 20. The memory may also store one or more functional modules, such as an application or program, to provide additional functionality for apparatuses 10 and 20. The components of apparatuses 10 and 20 may be implemented in hardware, or as any suitable combination of hardware and software. According to certain example embodiments, apparatuses 10 and 20 may optionally be configured to communicate each other (in any combination) via a wireless or wired communication links 70 according to any radio access technology, such as NR.

According to certain example embodiments, processors 12 and 22 and memories 14 and 24 may be included in or may form a part of processing circuitry or control circuitry. In addition, in some example embodiments, transceivers 18 and 28 may be included in or may form a part of transceiving circuitry.

For instance, in certain example embodiments, apparatus 10 may be controlled by memory 14 and processor 12 to receive, from a network element, a configuration to transmit an indication of an uplink transmission adjustment to the network element. Apparatus 10 may also be controlled by memory 14 and processor 12 to determine an existence of overlapping of uplink transmissions to the network element. Apparatus 10 may further be controlled by memory 14 and processor 12 to transmit, in response to the determination of the existence of overlapping of uplink transmissions, the indication to the network element. In addition, apparatus 10 may be controlled by memory 14 and processor 12 to perform, in response to the determination of the existence of overlapping of uplink transmissions, at least one of the uplink transmission adjustment of the uplink transmission to the network element or an uplink scheduling adjustment.

In other example embodiments, apparatus 20 may be controlled by memory 24 and processor 22 to configure a user equipment to transmit an indication of an uplink transmission adjustment. Apparatus 20 may also be controlled by memory 24 and processor 22 to receive overlapping uplink transmissions from the user equipment. Apparatus 20 may further be controlled by memory 24 and processor 22 to receive, from the user equipment, the indication due to the overlapping of the uplink transmissions.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for receiving, from a network element, a configuration to transmit an indication of an uplink transmission adjustment to the network element. The apparatus may also include means for determining an existence of overlapping of uplink transmissions to the network element. The apparatus may further include means for transmitting, in response to the determination of the existence of overlapping of uplink transmissions, the indication to the network element. In addition, the apparatus may include means for performing, in response to the determination of the existence of overlapping of uplink transmissions, at least one of the uplink transmission adjustment of the uplink transmission to the network element or an uplink scheduling adjustment.

Other example embodiments may be directed to an apparatus that includes means for performing any of the methods described herein including, for example, means for configuring a user equipment to transmit an indication of an uplink transmission adjustment. The apparatus may also include means for receiving overlapping uplink transmissions from the user equipment. The apparatus may further include means for receiving, from the user equipment, the indication due to the overlapping of the uplink transmissions.

Certain example embodiments described herein provide several technical improvements, enhancements, and/or advantages. For instance, in some example embodiments, it may be possible to reflect power reduction prioritization (e.g., dropping or significant power reduction) due to overlapping/parallel (or simultaneous) UL transmissions in existing procedures. Other example embodiments may provide advantageous enhancements/improvements in PDCCH link adaptation (LA), PUSCH LA and adaptive transmission bandwidth (ATB), scheduling restriction, proactive hybrid automatic repeat request (HARQ), and control message reliability.

For LA, the number of control channel elements (CCEs) used by a DCI may be determined by a PDCCH link quality metric that is derived from CQI feedback or UL PUSCH DTX or both. Conventionally, an indication of PUSCH DTX may be a sufficient condition to decrease the estimated PDCCH link quality. In certain example embodiments, the UE of PUSCH DTX due to power (de)-prioritization may be used as a cancelling condition to reduce the PDCCH link quality metric when DTX is judged by the receiver. The obtained result is a reduced PDCCH region utilization and reduced PDCCH blocking without sacrificing PDCCH block error rate (BLER), leading to higher PUSCH throughput and reduced data latency.

For PUSCH LA and ATB, UL modulation coding scheme (MCS) and transmission bandwidth may be partially determined by a PUSCH link quality metric that is derived from any combination of UL signal to interference and noise ratio (SINR) measurements, and DTX estimation at the receiver and HARQ ACK/NACK. An indication of power reduction due to power prioritization may serve as a cancelling condition to reducing the PUSCH link quality metric when NACK is judged by the receiver. Furthermore, an indication with the amount of power reduction due to simultaneous transmission may be utilized by link adaptation to limit the MCS and transmission bandwidth of future simultaneous transmissions. The result of both applications to LA and ATB is higher user throughput.

In scheduling restriction, UEs that have been indicated to suffer DTX (i.e., blanking) or a significant amount of power reduction during simultaneous transmission may be restricted from the UL scheduling list of the lower-prioritized cell(s). Further, in proactive HARQ, transmissions that are indicated to suffer from DTX or indicated with a significant amount of power reduction can automatically be rescheduled, resulting in reduced packet latency.

For control message reliability, transmit power reduction (via reduced frequency domain allocation or reduced power per resource block or both) or transmit blanking may be applied to the UE at the higher-prioritized cell(s) during control message transmission by the UE at the lower-prioritized cell. This may allow the UE that has been indicated to suffer significant power loss or DTX during simultaneous transmission to improve control message transmission reliability. Additionally, key performance indicators (KPIs) such as handover success rate, RRC reconfiguration success ratio, etc. may be improved.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

PARTIAL GLOSSARY

3GPP 3rd Generation Partnership Project
5G 5th Generation
5GCN 5G Core Network
5GS 5G System
BS Base Station
CORESET Control Resource Set CSI Channel State Information
DCI Downlink Control Information
DL Downlink
eNB Enhanced Node B
E-UTRAN Evolved UTRAN
FR1 Frequency Range 1
gNB 5G or Next Generation NodeB
HARQ Hybrid Automatic Repeat Request
HARQ-ACK HARQ Acknowledgment
LTE Long Term Evolution
MAC CE Medium Access Control Control Element
NR New Radio
NTN Non-Terrestrial Network
PDCCH Physical Downlink Control Channel
PDSCH Physical Downlink Shared Channel
PUCCH Physical Uplink Control Channel
PUSCH Physical Uplink Shared Channel
RAN Radio Access Network
RS Reference Signal
SR Scheduling Request
SRI SRS Resource Indicator
SRS Sounding Reference Signal
SSB Synchronization Signal Block
TRP Transmission Reception Point
UCI Uplink Control Information
UE User Equipment
UL Uplink

We claim:

1. An apparatus, comprising:
at least one processor; and
at least one memory storing instructions, wherein the instructions, when executed by the at least one processor, cause the apparatus at least to:
receive, from a network element, a configuration to transmit an indication of an uplink transmission adjustment to the network element;
determine an existence of overlapping of uplink transmissions to the network element;
transmit, in response to the determination of the existence of overlapping of uplink transmissions, the indication to the network element; and
perform, in response to the determination of the existence of overlapping of uplink transmissions, at least one of the uplink transmission adjustment of the uplink transmission to the network element or an uplink scheduling adjustment,
wherein the uplink transmission adjustment comprises at least one of a blanking of or power reduction for an uplink transmission, and
wherein the indication comprises at least one of the following:
whether or not the apparatus has applied the uplink transmission adjustment,
a partial or a full blanking of the uplink transmission,
a number of transmissions, cells, or links over which the apparatus has applied the uplink transmission adjustment,
an indication of an index or identity for one or more component carriers, a cell group, a bandwidth, a control resource set pool, a panel identifier, a transmission reception point, a remote radio head, a node, or an uplink or a downlink reference resource set that the uplink transmission adjustment corresponds to or is related to, or
an indication of an uplink signal or an uplink channel that the uplink transmission adjustment corresponds to or is related to.

2. The apparatus according to claim 1, wherein the configuration to transmit the indication comprises at least one of the following:
a configuration of the indication to be transmitted per component carrier or per cell group, per bandwidth part or per bandwidth, per panel, per control resource set pool index, per reference signal set, or per transmission reception point,
a configuration of the indication to be transmitted through at least one uplink resource on a primary cell, a primary cell group, or a primary link,
a configuration of the indication to be transmitted on at least one uplink resource on a cell or cell group over which a blanking or a transmit power reduction due to power prioritization has occurred, configuration of the indication to be transmitted on at least one uplink resource corresponding to at least one dedicated or configured cell, a cell group, or a link,
a configuration of the indication to be transmitted in at least one of the overlapping uplink transmissions, or
a configuration of the indication to be transmitted after a period of time from the overlapping uplink transmissions.

3. The apparatus according to claim 1, wherein the performance of the uplink transmission blanking of the uplink transmission or power reduction for the uplink transmission is triggered by a power reduction prioritization of at least one uplink transmission.

4. The apparatus according to claim 1, wherein the indication is transmitted through at least one of the following:
an uplink control information that is sent or multiplexed on a physical uplink control channel or a physical uplink shared channel of a primary cell,
an uplink control information that is sent or multiplexed on a physical control channel or a physical shared channel of a secondary cell over which the uplink transmission adjustment is applied,
a medium access control control element through an uplink resource on a primary cell or a secondary cell,
an uplink channel or an uplink signal,
an uplink resource selection by the apparatus, or
a dedicated or a shared periodic uplink resource, a semi-persistent uplink resource, or a scheduling-request-like resource.

5. The apparatus according to claim 4, wherein the physical uplink control channel or the physical uplink shared channel is part of the overlapping uplink transmissions or a different uplink transmission.

6. The apparatus according to claim 1, wherein the indication comprises information indicative of a power reduction larger than an offset or a power reduction leading to a transmit power lower than a threshold.

7. An apparatus, comprising:
at least one processor; and
at least one memory storing instructions, wherein the instructions, when executed by the at least one processor, cause the apparatus at least to:
configure a user equipment to transmit an indication of an uplink transmission adjustment;
receive overlapping uplink transmissions from the user equipment; and
receive, from the user equipment, the indication due to the overlapping of the uplink transmissions,
wherein the uplink transmission adjustment comprises at least one of a blanking of or power reduction for an uplink transmission, and wherein the indication comprises at least one of the following:

whether or not the apparatus has applied the uplink transmission adjustment, a partial or a full blanking of the uplink transmission, a number of transmissions, cells, or links over which the apparatus has applied the uplink transmission adjustment, an indication of an index or identity for one or more component carriers, a cell group, a bandwidth, a control resource set pool, a panel identifier, a transmission reception point, a remote radio head, a node, or an uplink or a downlink reference resource set that the uplink transmission adjustment corresponds to or is related to, or an indication of an uplink signal or an uplink channel that the uplink transmission adjustment corresponds to or is related to.

8. The apparatus according to claim 7, wherein the configuration of the user equipment to transmit the indication comprises at least one of the following:

a configuration of the indication to be transmitted per component carrier or per cell group, per bandwidth part or per bandwidth, per panel, per control resource set pool index, per reference signal set, or per transmission reception point, a configuration of the indication to be transmitted through at least one uplink resource on a primary cell, a primary cell group, or a primary link, a configuration of the indication to be transmitted on at least one uplink resource on a cell or cell group over which a blanking or a transmit power reduction due to power prioritization has occurred, configuration of the indication to be transmitted on at least one uplink resource corresponding to at least one dedicated or configured cell, a cell group, or a link, a configuration of the indication to be transmitted in at least one of the overlapping uplink transmissions, or a configuration of the indication to be transmitted after a period of time from the overlapping uplink transmissions.

9. The apparatus according to claim 7, wherein the indication is received through at least one of the following:

an uplink control information that is sent or multiplexed on a physical uplink control channel or a physical uplink shared channel of a primary cell, an uplink control information that is sent or multiplexed on a physical control channel or a physical shared channel of a secondary cell over which the uplink transmission adjustment is applied, a medium access control control element through an uplink resource on a primary cell or a secondary cell, an uplink channel or an uplink signal, an uplink resource selection by the apparatus, or a dedicated or a shared periodic uplink resource, a semi-persistent uplink resource, or a scheduling-request-like resource.

10. A method in an apparatus, the method comprising:

receiving, from a network element, a configuration to transmit an indication of an uplink transmission adjustment to the network element;

determining an existence of overlapping of uplink transmissions to the network element;

transmitting, in response to the determination of the existence of overlapping of uplink transmissions, the indication to the network element; and performing, in response to the determination of the existence of overlapping of uplink transmissions, at least one of the uplink transmission adjustment of the uplink transmission to the network element or an uplink scheduling adjustment, wherein the uplink transmission adjustment comprises at least one of a blanking of or power reduction for an uplink transmission, and wherein the indication comprises at least one of the following:

whether or not the apparatus has applied the uplink transmission adjustment, a partial or a full blanking of the uplink transmission, a number of transmissions, cells, or links over which the apparatus has applied the uplink transmission adjustment, an indication of an index or identity for one or more component carriers, a cell group, a bandwidth, a control resource set pool, a panel identifier, a transmission reception point, a remote radio head, a node, or an uplink or a downlink reference resource set that the uplink transmission adjustment corresponds to or is related to, or an indication of an uplink signal or an uplink channel that the uplink transmission adjustment corresponds to or is related to.

11. The method according to claim 10, wherein the configuration to transmit the indication comprises at least one of the following:

a configuration of the indication to be transmitted per component carrier or per cell group, per bandwidth part or per bandwidth, per panel, per control resource set pool index, per reference signal set, or per transmission reception point, a configuration of the indication to be transmitted through at least one uplink resource on a primary cell, a primary cell group, or a primary link, a configuration of the indication to be transmitted on at least one uplink resource on a cell or cell group over which a blanking or a transmit power reduction due to power prioritization has occurred, configuration of the indication to be transmitted on at least one uplink resource corresponding to at least one dedicated or configured cell, a cell group, or a link, a configuration of the indication to be transmitted in at least one of the overlapping uplink transmissions, or a configuration of the indication to be transmitted after a period of time from the overlapping uplink transmissions.

12. The method according to claim 10, wherein the performance of the uplink transmission blanking of the uplink transmission or power reduction for the uplink transmission is triggered by a power reduction prioritization of at least one uplink transmission.

13. The method according to claim 10, wherein the indication is transmitted through at least one of the following:

an uplink control information that is sent or multiplexed on a physical uplink control channel or a physical uplink shared channel of a primary cell, an uplink control information that is sent or multiplexed on a physical control channel or a physical shared channel of a secondary cell over which the uplink transmission adjustment is applied, a medium access control control element through an uplink resource on a primary cell or a secondary cell, an uplink channel or an uplink signal, an uplink resource selection by the apparatus, or a dedicated or a shared periodic uplink resource, a semi-persistent uplink resource, or a scheduling-request-like resource.

14. The method according to claim 13, wherein the physical uplink control channel or the physical uplink shared channel is part of the overlapping uplink transmissions or a different uplink transmission.

15. The method according to claim 10, wherein the indication comprises information indicative of a power reduction larger than an offset or a power reduction leading to a transmit power lower than a threshold.

* * * * *